United States Patent [19]

Langley

[11] 4,364,814
[45] Dec. 21, 1982

[54] APPARATUS FOR THE PRODUCTION OF AQUEOUS ALKALI METAL HYPOCHLORITE

[76] Inventor: Robert C. Langley, 214 Old Forge Rd., Millington, N.J. 07946

[21] Appl. No.: 265,548

[22] Filed: May 20, 1981

[51] Int. Cl.³ .................. C25B 9/00; C25B 11/03; C25B 11/10
[52] U.S. Cl. .................... 204/278; 204/284; 204/288; 204/290 F
[58] Field of Search ............ 204/95, 271, 278, 290 F, 204/149, 284, 288, 275–277

[56] References Cited
U.S. PATENT DOCUMENTS

| | | | |
|---|---|---|---|
| 1,992,310 | 2/1935 | Hultman | 204/275 X |
| 3,433,729 | 3/1969 | Proskuryakov et al. | 204/278 |
| 3,546,089 | 12/1970 | Schneider | 204/278 |
| 4,316,787 | 2/1982 | Themy | 204/271 X |

*Primary Examiner*—Donald R. Valentine
*Attorney, Agent, or Firm*—Karl F. Ross

[57] ABSTRACT

An apparatus is disclosed for the electrolytic production of a solution of an aqueous alkali metal hypochlorite solution. The apparatus is especially useful for chlorinating swimming pools. The single vessel is partitioned horizontally into an upper compartment for the brine and a lower compartment serving as the electrolytic cell and provided with a removable electrode assembly with an electrode spacing of at least 0.5 inch. Brine feeds through and evolved gas emerges through the partition.

9 Claims, 6 Drawing Figures

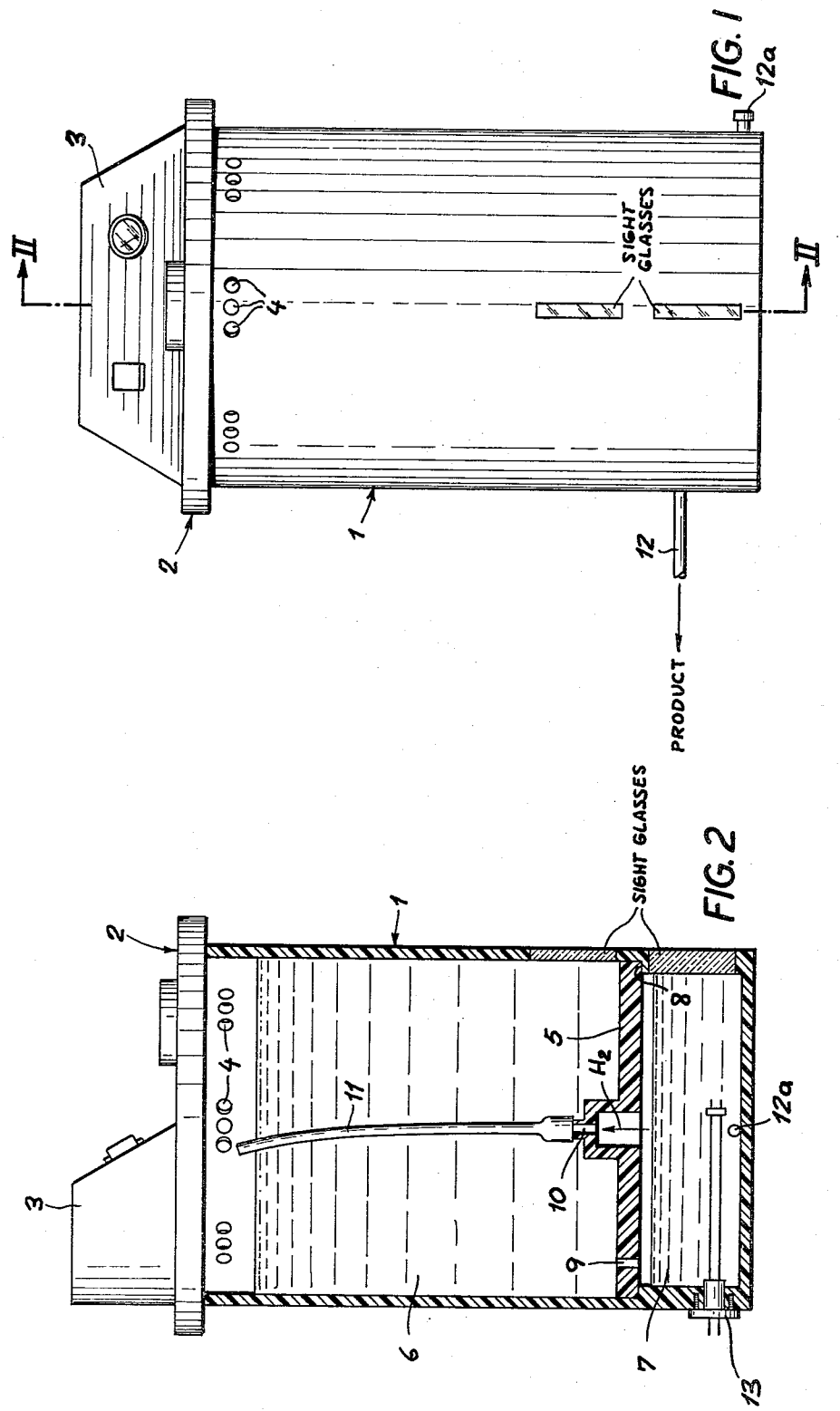

APPARATUS FOR THE PRODUCTION OF AQUEOUS ALKALI METAL HYPOCHLORITE

FIELD OF THE INVENTION

This invention relates to an apparatus for the electrolytic production of an aqueous alkali metal hypochlorite solution from brine. The apparatus is particularly useful for chlorinating swimming pool water, especially water in domestic swimming pools.

BACKGROUND OF THE INVENTION

Domestic swimming pools have been increasing in popularity for years. This is particularly the case in the states of the Sun Belt where mild weather permits pools to be used as much as ten months of the year. All pools require chemical treatment to destroy potentially harmful bacterial and unsightly algae growths. In the past, treatment has most commonly been done by daily additions of calcium hypochlorite powder to maintain a residual chlorine level of about 1 ppm, determined by a colormetric test kit.

In recent years, sharp increases in the cost of energy have caused major increases in the cost to the consumer of calcium hypochlorite because this chemical is produced by electrical energy and because it is shipped as 65% calcium hypochlorite stabilized by 35% inert ingredient. By contrast, ordinary salt has not escalated in price and can be used in an electrochemical cell to produce chlorine at the point of use. Several manufacturers market small cells for domestic swimming pools and these have been accepted by consumers on the basis of major savings in cost of chlorinating their pools. The cells are incorporated in systems which allow chlorination to proceed automatically whenever the pump of the pool filter is operating.

In addition to cost savings compared to purchased calcium hypochlorite convenience in chlorinating their pools is a more important point with most consumers. A cell which operated with little or no maintenance, incorporated in a system which automatically chlorinates the pool and which requires the user's attention infrequently, for example once a week, will have strong chemical appeal in this market.

A further advantage of automatic chlorinator systems, is that residual chlorine levels can be maintained at uniform levels. This contrasts with manual addition of excess calcium hypochlorite once a day; in this case excess residual chlorine exists at certain times and there may be no residual chlorine at other times.

There are two approaches to chlorinating domestic swimming pools when using salt as starting material. One approach is to produce chlorine gas in a cell designed to allow removal of the gas. This proceeds by this electrochemical reaction:

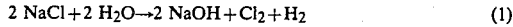

$$2 NaCl + 2 H_2O \rightarrow 2 NaOH + Cl_2 + H_2 \qquad (1)$$

The second approach is to produce sodium hypochlorite. This is done by design and operation of a cell in which chlorine is reacted with caustic as produced. This chemical mixing reaction proceeds as follows:

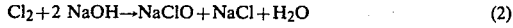

$$Cl_2 + 2 NaOH \rightarrow NaClO + NaCl + H_2O \qquad (2)$$

In industry, both processes are carried out on large scale. Equation 1 describes the process by which millions of tons of chlorine are produced annually throughout the world. Industrial chlorine plants operate continuously to produce a pure product at high current efficiency.

A domestic swimming pool requires a maximum of one pound of chlorine per day. Several cell designs of this capacity are on the market but their output of chlorine declines sharply after a short period of use. This unsatisfactory performance is due to faulty design, as can be seen from the following discussion.

It appears attractive to produce chlorine as gas in a small cell because the gas can be readily removed from the cell by aspiration through plastic tubing connected to the suction side of the swimming pool pump. With suitable wiring (timer, switch etc.) this allows chlorine to be produced and gradually fed into flowing water whenever the pump is operating. The problem is that when chlorine is produced at the anode, an equivalent amount of caustic is produced at the cathode. The two products must be physically separated to prevent the hypochlorite reaction, (Equation 2) from taking place. This separation is accomplished in swimming pool cells by placing an ion selective membrane between anolyte and catholyte compartments. In operation, salt and water are supplied to the anolyte. Under a potential sodium ions pass through the membrane to form caustic at the cathode. The membrane prevents caustic from entering the anolyte compartment, so chlorine produced at the anode soon exceeds its low solubility in brine and goes out of the electrolyte as a gas.

However, all ion selective membranes suitable for use in chlorine cells, are very sensitive to clogging by cations such as calcium and magnesium. In industrial chlorine plants which use membrane cells, calcium and magnesium are common impurities in the raw brine. They are removed by caustic and soda ash precipitations, followed by treatment of the brine with ion exchange resins and a polishing filtration step. The treated brine is continuously monitored for hardness by sensitive detectors to prevent calcium and magnesium from entering the membrane cells. Small chlorine cells for use with swimming pools are charged with salt of varying purity dissolved in water from the household supply or from the pool. Calcium and magnesium are almost always present. As these ions clog an ion selective membrane, transport of sodium ions is reduced and chlorine output drops proportionately.

When used by the general public, ion selective membranes are subject to puncture because they are thin, typically having thickness of five of six mills. Even small punctures allow caustic to enter the anolyte and this reduces evolution of gaseous chlorine. Another drawback is that ion selective membranes cost $35 to $40 per square foot at wholesale, so frequency replacement by the consumer is a substantial operating expense.

Some manufacturers of swimming pool chlorinators have designed systems in which a low level of salt is maintained in the swimming pool. When pool water is circulated through a cell, chlorine is produced electrochemically. There is no separator in the cell and chlorine is converted to sodium hypochlorite by reaction with caustic. These cells can be quite compact and are usually installed in the return line from the filter to the pool. This design approach avoids the problems of membrane cells, but new problems are introduced and frequent failures occur. A discussion of these problems follows.

If the salt supply for a cell comes from the swimming pool, salt content must be very low to avoid discomfort to swimmers. Chlorinator manufacturers recommend salt content of 0.3%, about one tenth the content of sea water. An electrolyte of this concentration has high electrical resistance and cell designers have compensated for this by spacing electrodes closely, typically one sixteenth of an inch. In these designs, anodes are made of titanium sheet or mesh coated with an electrocatalyst such as ruthenium oxide or platinum. Cathodes are titanium or steel and electrode spacing of one sixteenth is readily achieved. Most swimming pools contain calcium in solution, derived from the water supply, prior treatment with calcium hypochlorite or from leaching of concrete structures. In a cell, calcium compounds are formed as tenacious deposits on the cathode. In a few weeks of operation, these deposits can clog a sixteenth inch space resulting in reduction of electrolyte flow through the cell and finally in clogging. When electrolyte flow is greatly diminished, the cell can be destroyed by overheating. This has been a common type of failure of one cell on the market. This cell uses more than 200 Watts, supplied to a volume of about half a liter.

Designers have approached the clogging problem in hypochlorite cells by interrupting the voltage periodically, for example, for 10 minutes in each hour of operation, to allow fluid flow to remove cathode deposits. This is not a complete solution, as field failures continue to be common. It is very well known in the art that these deposits are not easily removed. One manufacturer recommends that the user remove the cell periodically and soak it in hydrochloric acid to dissolve calcium deposits. This raises problems of safety as the consumer must transport, store and use a strong acid.

In systems which operate on a low salt content maintained in the pool, there is another cause for premature failure of the cell. In a situation where flow is significantly reduced, salt content can be completely depleted and oxygen becomes the product at the anode. Anode coatings such as ruthenium oxide or platinum have very long lives when evolving chlorine. When evolving oxygen, ruthenium oxide wears rapidly and passivates quickly. Platinum wears less rapidly than ruthenium oxide, but still at a rate many times the rate when evolving chlorine. In domestic swimming pools, reductions in flow commonly occur due, for example, to an article of clothing drawn into the pump strainer or to a filter which is greatly overloaded while operating unattended.

To summarize the prior art in the field of domestic swimming pool chlorinators, there have been two design approaches to cells and systems. One method is to produce chlorine gas and mix this into recirculating pool water. The other method is to produce sodium hypochlorite from a low salt content in the pool water. Three or four manufacturers market systems to swimming pool owners. Despite variations in designs, all systems are subject to early and frequent cell failure. There is a need for a cell which will operate reliably when used by the general public under typical conditions found in domestic swimming pools. There is a further need that a reliable chlorinator cell be incorporated in a system which can automatically feed cell product into a swimming pool.

OBJECTS OF THE INVENTION

It is the object of the invention to provide an apparatus for the production of aqueous alkali metal hypochlorite solution without encountering the problems of clogging of said apparatus by tenacious calcium and/or magnesium deposits.

It is a further object of the invention to provide an apparatus for continuously electrolytically producing an aqueous, alkali metal hypochlorite solution without encountering frequent cell failure.

It is a further object of the invention to provide a safe, low cost apparatus with little need for maintenance to produce an aqueous alkali metal hypochlorite solution for a variety of industrial purposes, but especially for the chlorination of domestic swimming pools.

SUMMARY OF THE INVENTION

These objects are attained, in accordance with the present invention, by providing a single vessel. The single vessel is partitioned horizontally into an upper compartment for the brine and a lower compartment serving as the electrolytic cell and provided with a removable electrode assembly with an electrode spacing of at least 0.5 inch. Brine feeds through and evolved gas emerges through the partition. The tank is provided with means for forming a vent at an upper part in said tank. Preferably the vent consists of at least one hole in either the upper part of said wall of said tank or in a tank cover movably mounted on said tank.

An electrode assembly is inserted into the tank and is removable therefrom. The electrode assembly comprises an anode, a cathode, and a support. It is very important that the support holds the anode and the cathode at least one-half inch from one another, but in juxtaposed relation. Preferably the anode and the cathode are spaced one inch apart ±0.1 inches.

The reason why it is so important that the anode and cathode be spaced at least one-half inch apart is that the removable electrode assembly may be easily cleaned between said anode and said cathode. The one-inch minimum spacing is required in order to easily remove tenacious calcium and/or magnesium deposits which build up between said electrodes. It is extremely difficult to clean such a space between said electrodes that is less than one-half inch.

Where the tank is to be used for electrolytic production of alkali metal hypochlorite (e.g. sodium hypochlorite) from an alkali chloride-containing brine, a D.C. power source (e.g. rectifier) is attached electrically to each electrode in the electrode assembly thereby forming an electrolytic cell. Preferably the D.C. power source is housed within the movable tank cover. Preferably the potential from the D.C. power source amounts to about 5 volts.

A partition is included within said tank and divides the tank into two compartments, an upper compartment and a lower compartment. The upper compartment contains brine. The lower compartment contains the electrode assembly and is where the alkali metal hypochlorite solution is produced. The partition defines at least one hole to controllably allow brine to pass from the upper compartment to the lower compartment containing the electrode assembly.

The lower compartment contains means to remove hydrogen produced at the cathode during the electrolysis of the brine to produce the aqueous alkali metal hypochlorite solution. Preferably the means include a tube open at both ends and positioned upwardly through a second hole in said partition. The tube extends upwardly through the brine in the upper compartment of the tank and preferably terminates above the brine level. The hydrogen upon leaving the tube in the upper compartment exits the tank through the vent in the upper portion of same.

Also present is a product line (e.g. tube open at both ends) leading from the lower compartment of said tank through an opening within a wall of said tank to permit withdrawal of said aqueous alkali metal hypochlorite solution. A particularly good use for the aqueous alkali metal hypochlorite solution is to chlorinate domestic swimming pools, though there is no reason why the aqueous solution cannot be used for any conventional purposes.

The lower compartment may also contain in the tank wall a means for draining the contents of the lower compartment such as a hole and stopper. The lower compartment tank wall may also contain a sight glass to permit one to determine the level of the aqueous alkali metal hypochlorite solution in the lower compartment.

The anode and the cathode in said electrode assembly can each be made of any material conventionally used in the electrolytic production of aqueous alkali metal hypochlorite solution from the corresponding alkali metal brine. Preferably the anode comprises titanium expanded mesh coated with platinum-iridium. Preferably the cathode comprises titanium expanded mesh coated with silver-titanium. These cathodes can be made as described in U.S. Pat. No. 4,186,066.

More specifically the electrode assembly removable from said tank preferably comprises as the support a cylindrical insulating body receivable in a hole in the wall of the lower compartment of said tank. The anode and the cathode project horizontally from said body. Preferably the support is formed as a plug having conductual tabs of different size wherein one of said tabs is connected to the cathode and the other tab is connected to the anode. There is also a connector attached to the plug and which has terminals to match the tabs within the plug. The terminals attached to the plug may then be connected by wires to the D.C. power source.

The support is preferably mounted to said tank by screws spaced so as to maintain a predetermined position of said anode relative to said cathode. The advantage to such spacing is that the electrode assembly, after cleaning, may be mounted back into the lower compartment of the tank in but one way. As a result there will never be confusion as to which electrode is the anode and which electrode is the cathode.

BRIEF DESCRIPTION OF THE DRAWING

These objects and other objects, features, and advantages will become more readily apparent from the following, reference being made to the accompanying drawing in which:

FIG. 1 is an elevational view of the apparatus according to the invention;

FIG. 2 is a sectional view taken along line II—II of FIG. 1;

SPECIFIC DESCRIPTION

Figure 3:
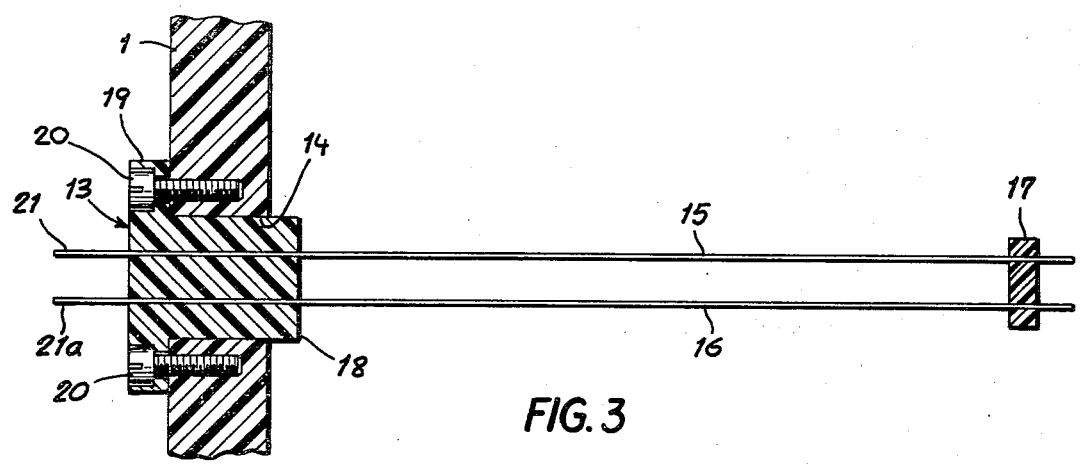
FIG. 3 is a detail view of the electrode assembly according to the invention.

As shown in FIGS. 1 and 2 a tank 1 is provided with a movable tank cover 2 on which rests a D.C. power source 3 (e.g. rectifier). The D.C. power source may be clamped to the movable tank cover 2. The tank is further provided with at least one vent hole 4 at its upper end. A voltmeter may be electrically connected to the rectifier to determine potential.

The interior of the tank is provided with a cell cover 5 which forms a partition which divides the inside of the tank into two compartments; upper compartment 6 and lower compartment 7. Cell cover 5 is supported by shoulder 8 attached to the wall of the tank in the lower compartment. Cell cover 5 further includes channels 9 and 10 which communicate between said upper compartment and said lower compartment. A hose 11 extends upwardly from channel 10 into the upper compartment and terminates in the vicinity of vent holes 4 near the top of the upper compartment.

The lower compartment 7 contains product line 12 mounted into the tank wall. At the base of the lower compartment a drain and plug 12a is provided. Electrode assembly 13 is removably mounted in the lower compartment of said tank and may be removed from said lower compartment through passage 14. The electrode assembly is electrically connected to the D.C. power source by two wires (not shown).

Figure 4:
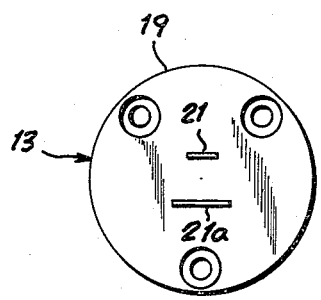
FIG. 4 is a front view of the electrode assembly.
Figure 5:
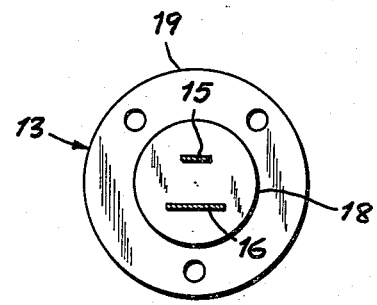
FIG. 5 is a rear view of FIG. 4.
Figure 6:
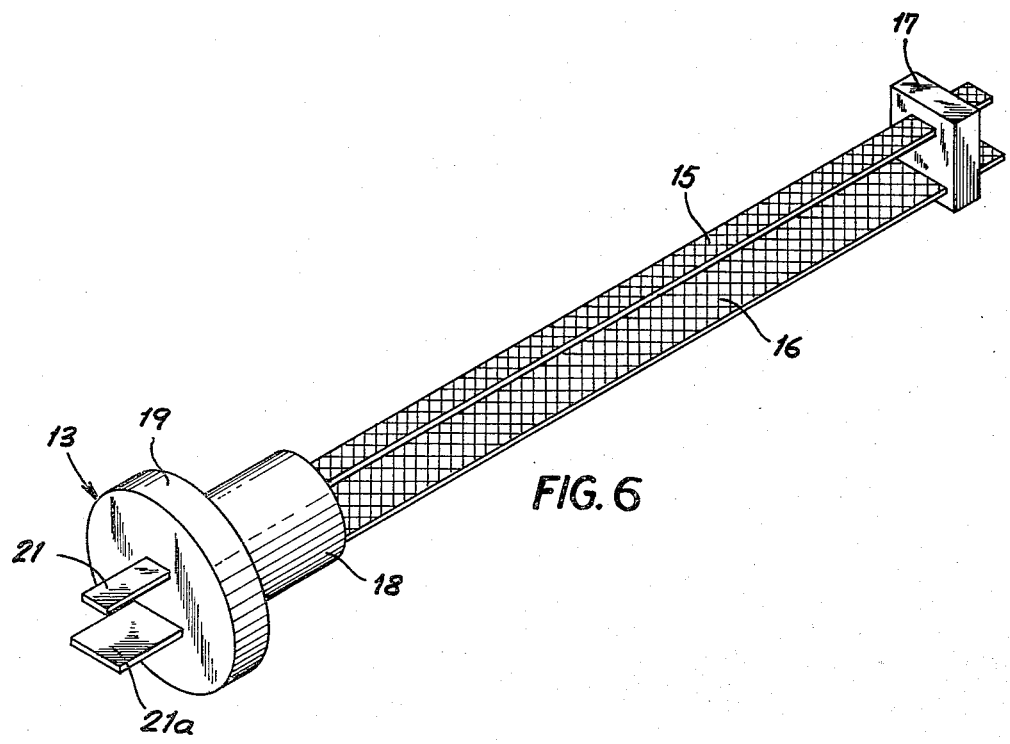
FIG. 6 is a detail perspective of the electrode assembly.

As shown in FIGS. 3-6 the electrode assembly 13 is removably inserted into the tank wall in passage 14. The electrode assembly comprises an anode 15, a cathode 16, an electrode spacer 17 inserted between said anode and said cathode, a plug 18, and a connector 19. The anode 15 and cathode 16 are received in slits in the plug 18 and are electrically connected to tabs 21 and 21a embedded in said connector. It is the tabs that are ultimately connected to the wires that run to the D.C. power source.

The plug and connector are secured to the tank wall of the lower compartment 7 of the tank 1 by fastening the connector to the wall of said tank with screws 20. The screws are inserted through the connector through corresponding holes in the wall of the tank in such a way that the screws are not equally spaced from one another when one faces the front of said connector. The plug secured to said connector is received in the lower compartment of said tank through passage 14.

In the operation of the apparatus brine is poured into the upper compartment 6 of the tank 1 when the movable tank cover 2 is displaced. When a sufficient supply of brine is added to said upper compartment which will produce a predetermined amount of alkali metal hypochlorite through electrolysis, the movable tank cover is closed and the D.C. power source is turned on. The brine passes controllably from the upper compartment 6 to the lower compartment 7 of the tank through passage 9. In the lower compartment the brine is electrolyzed to produce the corresponding alkali metal hypochlorite. The alkali metal hypochlorite product is led from the tank through product line 12. There the alkali metal hypochlorite can be channeled to whatever site deemed advantageous. A particularly advantageous use for the product is the chlorination of domestic swimming pools.

While the aqueous alkali metal hypochlorite is being produced during the electrolytic reaction in the lower compartment of the tank, hydrogen is also produced in said lower compartment at the cathode 16. The hydrogen is removed from the lower compartment by traveling through channel 10 into hose 11. The hydrogen travels upwardly through hose 11 through the upper compartment past the level of the brine where said hose 11 terminates. The hydrogen is ultimately passed out of the upper compartment through vent holes 4 into the atmosphere. I wish to emphasize that the amount of hydrogen released into the atmosphere is minimal and so there is no danger of fire when the apparatus is operated.

As mentioned hereinabove, it is very important that the space between the anode 15 and the cathode 16 be maintained at a minimum of one-half inch. Such a space is necessary in order to remove tenacious calcium and/or magnesium deposits that build up between the electrodes. Where the space between these electrodes is less than one-half-inch, removal of these tenacious deposits becomes very difficult.

After the operation of the apparatus has gone on for a period of time these tenacious deposits build up and it is time to remove the electrode assembly from the lower compartment of the tank and remove the deposits. The electrode assembly is unscrewed from the tank and immersed in water. A small brush or the like is used to remove the deposits from the electrodes. The minimum one-half inch space between the electrodes permits removal of the deposits in between with the brush. After cleaning the electrode assembly is again screwed into the lower compartment of the tank and the continuous production of aqueous alkali metal hypochlorite may resume.

There are several features of the electrode assembly described herein. For one thing I prefer to employ a cathode that is larger than the anode. Such a size difference in the electrodes prevents mixing up the polarity of same when electrically connecting the electrodes to the D.C. power source. Also the screws in the connector which serve to attach the entire electrode assembly to the lower compartment of the tank are not spaced equally from one another along the front of said connector. Such an unequal spacing means that the connector can be screwed into the corresponding holes drilled into the tank wall in but one way. Again such spacing of the screws avoids the possibility of confusing the electrodes and the polarity.

EXAMPLE 1

The lower compartment of the tank which has overall height of 30 inches, containing the electrode assembly holds 6 gallons of aqueous sodium hypochlorite solution and the product line is placed so that 3 gallons of the hypochlorite solution always remain and the electrodes are always covered. If the upper compartment of the tank is depleted of brine, the electrolytic cell can still run continuously without damage and will raise the temperature of 3 gallons of aqueous hypochlorite solution less than 10° C.

During construction, the cell cover can fit only in one position and it is adhesively bonded to the molded shoulder of the brine tank. With an inside diameter of 20 inches, the upper compartment of the tank holds a 7 day supply at the dimensions given. The cell cover has a series of holes on the edge opposite the product line. Fresh brine feeds gradually through these holes to equal the volume of fresh hypochlorite product withdrawn through the product line.

A raised portion of the cell cover is the hydrogen collector. The hydrogen rises through a half inch flexible tube with ends above the brine level and which is fastened near the vent holes at the rear of the upper compartment of the tank.

The salt feed is expressed in multiples of 5 pounds of salt to 9 gallons of water. Such a solution contains 6.25% NaCl. The product of electrolysis will contain 4% NaOCl.

EXAMPLE 2

By changing the inside diameter of the tank described in Example 1 to 24 inches, the capacity of the tank is increased 44%. By adding height to the upper compartment of the tank, another 3 or 4 days supply of brine can be stored if such a tank is made 6 or 7 inches taller. As a result such a system will be able to supply enough aqueous sodium hypochlorite solution to chlorinate a domestic swimming pool for 14 days. Such a system can operate for 14 days unattended.

Furthermore, if tests indicate that an 8% sodium hypochlorite aqueous solution is stable, potentially the system can operate for 28 days unattended.

To double the product from an apparatus of the above dimensions, a bipolar electrode could be placed between the anode and cathode. Operation of the electrolytic cell at 15 amps and double voltage (e.g. 10 volts) would produce 2 pounds of product per day. This approach has strong appeal from the viewpoint of inventory of components.

I claim:

1. An apparatus for the controlled production of an aqueous alkali metal hypochlorite solution, which comprises:
    (a) tank and means forming a vent at an upper part of said tank;
    (b) a tank cover movably mounted on the upper end of said tank;
    (c) an electrode assembly inserted into said tank and removable therefrom, said electrode assembly comprising an anode, a cathode, and a support holding the anode and the cathode at least one-half inch from one another, but in juxtaposed relation;
    (d) a D.C. power source electrically connected to said anode and to said cathode;
    (e) a partition within said tank dividing said tank into an upper compartment for containing brine and a lower compartment containing the electrode assembly, said partition defining at least one hole to controllably allow brine to pass from said upper compartment to said lower compartment and being provided with means for allowing hydrogen produced in the electrolytic cell in the lower compartment to pass through the brine in the upper compartment to then exit the tank through said vent; and
    (f) means communicating with said lower compartment to remove aqueous alkali metal hypochlorite solution therefrom.

2. The apparatus defined in claim 1 wherein said support comprises a cylindrical insulating body receivable in a hole in a wall of said tank, said anode and said cathode projecting horizontally from said body.

3. The apparatus defined in claim 1 wherein the support holds the anode and the cathode about one inch from one another.

4. The apparatus defined in claim 1 wherein said anode is composed of titanium mesh coated with platinum-iridium.

5. The apparatus defined in claim 1 wherein said cathode is composed of titanium mesh coated with silver.

6. The apparatus defined in claim 1 wherein said support is formed as a plug having conductive tabs of different sizes, one of said tabs being connected to said cathode, another of said tabs being connected to said anode, and a connector to said D.C. power source having terminals to match the tabs of said plug.

7. The apparatus defined in claim 1 wherein said support is mounted in said tank with screws spaced so as to maintain a predetermined position of said anode and said cathode.

8. The apparatus defined in claim 1, further comprising means for directing the aqueous alkali metal hypochlorite solution to a swimming pool.

9. An electrolysis tank which comprises:
 (a) a vessel and means forming a vent at an upper part of said vessel;
 (b) a cover movably mounted on said vessel;
 (c) an electrode assembly inserted into said tank and removable therefrom, said electrode assembly comprising an anode, a cathode, and a support holding the anode and the cathode at least one-half inch from one another, but in juxtaposed relation;
 (d) a partition within said tank dividing said tank into an upper compartment for containing a solution to be electrolyzed and a lower compartment containing the electrode assembly, said partition defining at least one hole to controllably allow said solution to pass from said upper compartment to said lower compartment and being provided with means for allowing gas produced in the lower compartment to pass through the solution in the upper compartment to then exit the tank through said vent; and
 (e) means communicating with said lower compartment to remove electrolysis product solution therefrom.

* * * * *